United States Patent
Reddy et al.

(10) Patent No.: US 11,301,827 B2
(45) Date of Patent: Apr. 12, 2022

(54) POINT-OF-SALE INTEGRATION SYSTEM AND METHOD OF USING SAME

(71) Applicants: Anil Reddy, East Brunswick, NJ (US); Albert J Stetz, III, Aberdeen, NJ (US)

(72) Inventors: Anil Reddy, East Brunswick, NJ (US); Albert J Stetz, III, Aberdeen, NJ (US)

(73) Assignee: ACCRUE RETAIL MOBILITICS INC., East Brunswick, NJ (US)

( * ) Notice: Subject to any disclaimer, the term of this patent is extended or adjusted under 35 U.S.C. 154(b) by 435 days.

(21) Appl. No.: 16/551,130

(22) Filed: Aug. 26, 2019

(65) Prior Publication Data

US 2021/0065151 A1 Mar. 4, 2021

(51) Int. Cl.
  *G06Q 20/20* (2012.01)
  *G06K 9/46* (2006.01)

(52) U.S. Cl.
  CPC .............. *G06Q 20/202* (2013.01); *G06K 9/46* (2013.01); *G06K 2209/01* (2013.01)

(58) Field of Classification Search
  CPC .................................................. G06Q 20/202
  See application file for complete search history.

(56) References Cited

U.S. PATENT DOCUMENTS

| | | |
|---|---|---|
| 5,484,988 A | 1/1996 | Hills et al. |
| 7,349,884 B1 | 3/2008 | Odom et al. |
| 9,135,491 B2 | 9/2015 | Morandi et al. |
| 2009/0216652 A1 | 8/2009 | Eggert et al. |
| 2018/0240311 A1* | 8/2018 | Gervais ................ G06Q 30/02 |
| 2019/0026739 A1 | 1/2019 | Sivashanmugam et al. |

FOREIGN PATENT DOCUMENTS

CA    2470254 C    2/2008

* cited by examiner

*Primary Examiner* — Allen C Chein
(74) *Attorney, Agent, or Firm* — Wei & Sleman LLP

(57) ABSTRACT

A method of linking a point-of-sale register and a payment terminal into an integrated point-of-sale system includes entering at least one item into the point-of-sale register, calculating a total cost of the at least one item, receiving an image from the point-of-sale register at an integrating device, the integrating device having a processor and a video capture card, locating the total cost in the image by identifying a target area, performing optical character recognition on the target area, and outputting a numerical total to a payment terminal.

18 Claims, 4 Drawing Sheets

POINT-OF-SALE INTEGRATION SYSTEM AND METHOD OF USING SAME

FIELD OF THE DISCLOSURE

The present disclosure generally relates to point-of-sale systems. More particularly, the present disclosure relates to devices, systems and methods for integrating a point-of-sale system to increase functionality and safety.

BACKGROUND OF THE DISCLOSURE

Point-of-sale (POS) systems are widely used by retailers, such as supermarkets, restaurants, hotels, liquor stores, gas stations, convenience stores and the like to perform basic accounting and inventory functions. The point-of-sale system can take a variety of forms, such as cashier-operated checkout systems (i.e. registers, cash registers, electronic cash registers), self-checkout systems, and other similar transaction-enabling and transaction-tracking devices. These are generally referred to as "registers". As used herein, such registers may also form a part of a point-of-sale system.

In a typical transaction, a checkout clerk may use the register system to ring up the purchased items and provide a total due to the customer. If the customer wishes to pay with a credit card, the clerk will take the total due and enter it into a payment terminal. The clerk will then take the customer's credit card and swipe or key it into a payment terminal to complete the transaction. Mistakes are common in transferring the total due from the register to the payment terminal, and such mistakes have to be reversed, if caught. These mistakes often lead to long checkout lines and an unpleasant experience for customers. Additionally, such mistakes cascade and lead to problems in reconciliation of accounting records. Additionally, it may be undesirable for a clerk to physically take possession of a customer's credit card and such possession may shift liability to the business.

SUMMARY OF THE DISCLOSURE

In some embodiments, a method of linking a point-of-sale register and a payment terminal into an integrated point-of-sale system includes entering at least one item into the point-of-sale register, calculating a total cost of the at least one item, receiving an image from the point-of-sale register at an integrating device, the integrating device having a processor and a video capture card, locating the total cost in the image by identifying a target area, performing optical character recognition on the target area, and outputting a numerical total to a payment terminal. Alternatively, a method of linking a point-of-sale system and a payment terminal using a similar process of directly capturing an image from a system, identifying the target area, performing optical character recognition on the target area, and outputting a numerical total to the credit card terminal.

BRIEF DESCRIPTION OF THE DISCLOSURE

Various embodiments of the presently disclosed devices, systems, and methods are shown herein with reference to the drawings, wherein.

Various embodiments of the present invention will now be described with reference to the appended drawings. It is to be appreciated that these drawings depict only some embodiments of the invention and are therefore not to be considered limiting of its scope.

DETAILED DESCRIPTION

Despite the various improvements that have been made to registers, point-of-sale systems and payment terminals, conventional systems and methods suffer from some shortcomings as described above.

Figure 1:
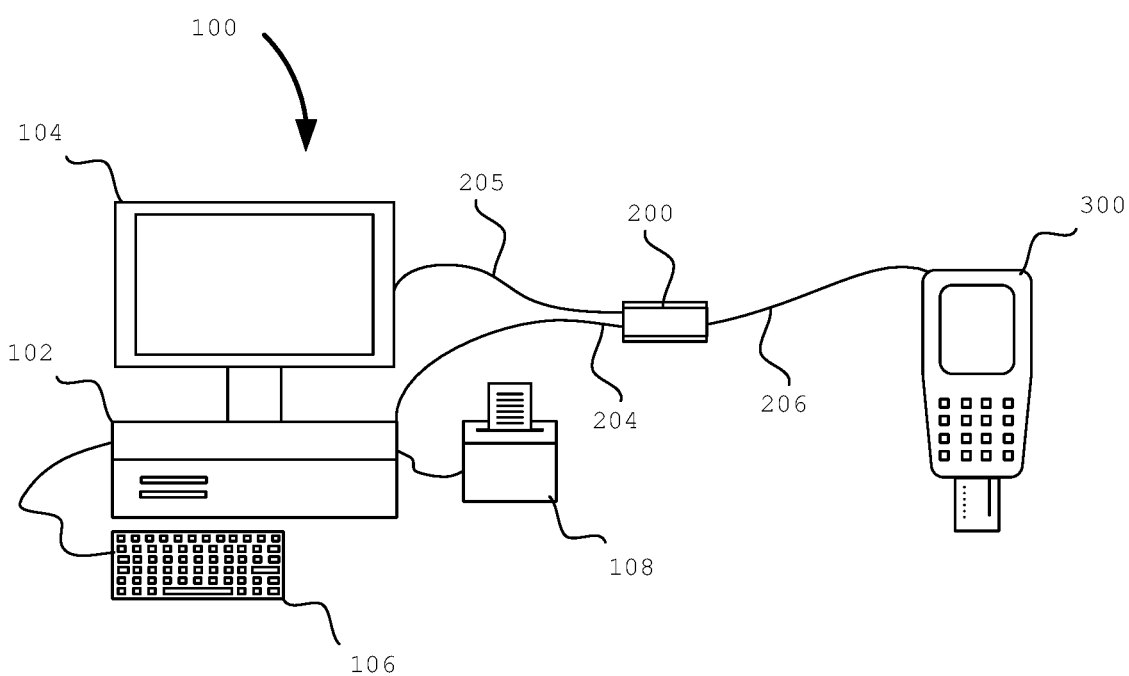
FIG. 1 is a schematic overview of an integrated point-of-sale system.

As shown in FIG. 1, in one embodiment a point-of-sale system/terminal 100 is provided. The point-of-sale system 100 can be a cashier-operated checkout system, (i.e. a register, cash register, electronic cash register, etc.), a self-checkout system, or any other similar transaction-enabling or transaction-tracking device. The point-of-sale system 100 may have the ability to record transactions, calculate taxes, store cash and other legal tender, calculate total purchase amounts, provide receipts, check inventory etc.

The point-of-sale system 100 may include a desktop computer having an internal/integrated CPU/controller/processor 102 (collectively termed a "processor" herein). Typically, the point-of-sale system also includes a monitor 104, and a data entry element 106 (e.g., mouse, keyboard, keypad, etc.). Point-of-sale system may also include an integrated point-of-sale printer 108. For example, the point-of-sale printer 108 may be a receipt printer configured to print receipts on roll paper or the like in the well-known manner. The point-of-sale system 100 may be electronically coupled to other point-of-sale systems in the same store (or elsewhere), and may be electronically coupled to other associated components of the store/retail establishment in order to allow the transfer of data between such components, for example, for controlling inventory.

As shown in FIG. 1, a payment terminal 300 in the form of a magnetic card reader may be able to read a magnetic code on a credit card, debit card, gift card, etc., and have an integrated keypad or signature pad. The electronic signature pad may be able to be written upon by a user to verify a transaction and may be coupled to or be part of, the magnetic card reader. The payment terminal may also have a chip reader for processing new cards having EMV payment capabilities. EMV is a technical standard for smart payment cards and for payment terminals and automated teller machines that can accept them, and the system includes smart cards having chips that store data on integrated circuits in addition to magnetic stripes (for backward compatibility). These include cards that must be physically inserted (or "dipped") into a reader, as well as contactless cards that can be read over a short distance using near-field communication (NFC) technology. Payment cards that comply with the EMV standard are often called Chip and PIN or Chip and Signature cards, depending on the authentication methods employed by the card issuer.

Figure 2:
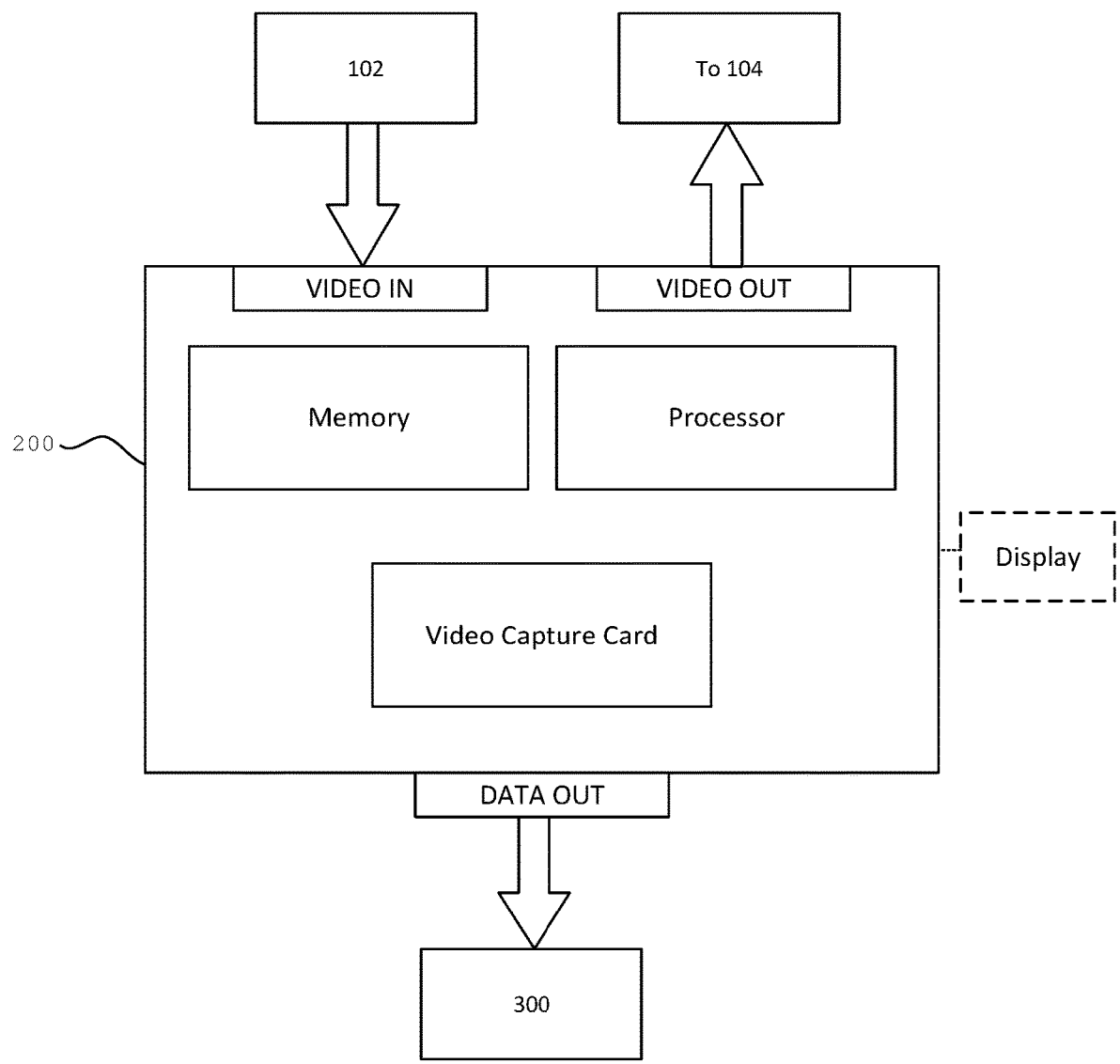
FIG. 2 is a schematic diagram showing components of an integrating device.

In one embodiment, the point-of-sale system 100 may be coupled to the payment terminal 300 via an intermediate integrating device 200. The details and components of integrating device 200 are shown in FIG. 2. Briefly, however, the integrating device 200 allows for integration between point-of-sale system 100 and payment terminal 300 and is robust enough so as to be compatible with various POS software, regardless of programming language or technical details.

Several configurations are possible, although as shown in FIG. 1, the integrating device 200 may receive a video image via input cable 204, and may have send a video image via output cable 205 back to monitor 104. In some examples, input and output cables may include HDMI cables. Alternatively, input and output cables may include composite Video (RCA or F-pin), S-Video (Super video), Component Video, DVI (Digital Visual Interface), HDMI (High Definition Multimedia Interface). In at least some examples, physical cables are not present, and the integrating device 200 is wirelessly in communication with processor 102 and monitor 104 via Bluetooth, Wi-Fi, NFC or other suitable connection(s). Integrating device 200 may also have a data cable 206 connecting it to the payment terminal 300. The integration unit connects to the payment terminal via a proprietary USB cable based on the terminal. As an example, if unit 300 is an INGENICO™ iSC 250 or an iSC 480, there exists a specific INGENICO™ iSC 250/iSC 480 USB cable to connect the devices. The merchant computer connects to the device via any of the video outputs mentioned above, then the device does internal processing and runs proprietary software commands which then relays the payment to the terminal via a proprietary USB cable.

FIG. 2 shows a more detailed view of the components of integrating device 200. As shown, integrating device 200 may include a CPU/controller/processor and a memory. Integrating device 200 may also include a video capture card. A video capture card generally converts video signals into digital data compatible with a computer. In this case, the video capture card is configured and arranged to receive video images from processor 102 through input cable 204, and convert them to digital data, allowing those video images to be processed. In at least some examples, the memory, processor and video capture card are all disposed within a same housing or enclosure. Alternatively, one or more of the components may be housed separately. Integrating device 200 may also have a video output cable 205 that sends an image back to monitor 104. Optionally, a display is included that allows for initial configuration of the device and troubleshooting failures. Integrating device 200 may also include a data cable that connects the device to payment terminal as previously described.

Figure 3:
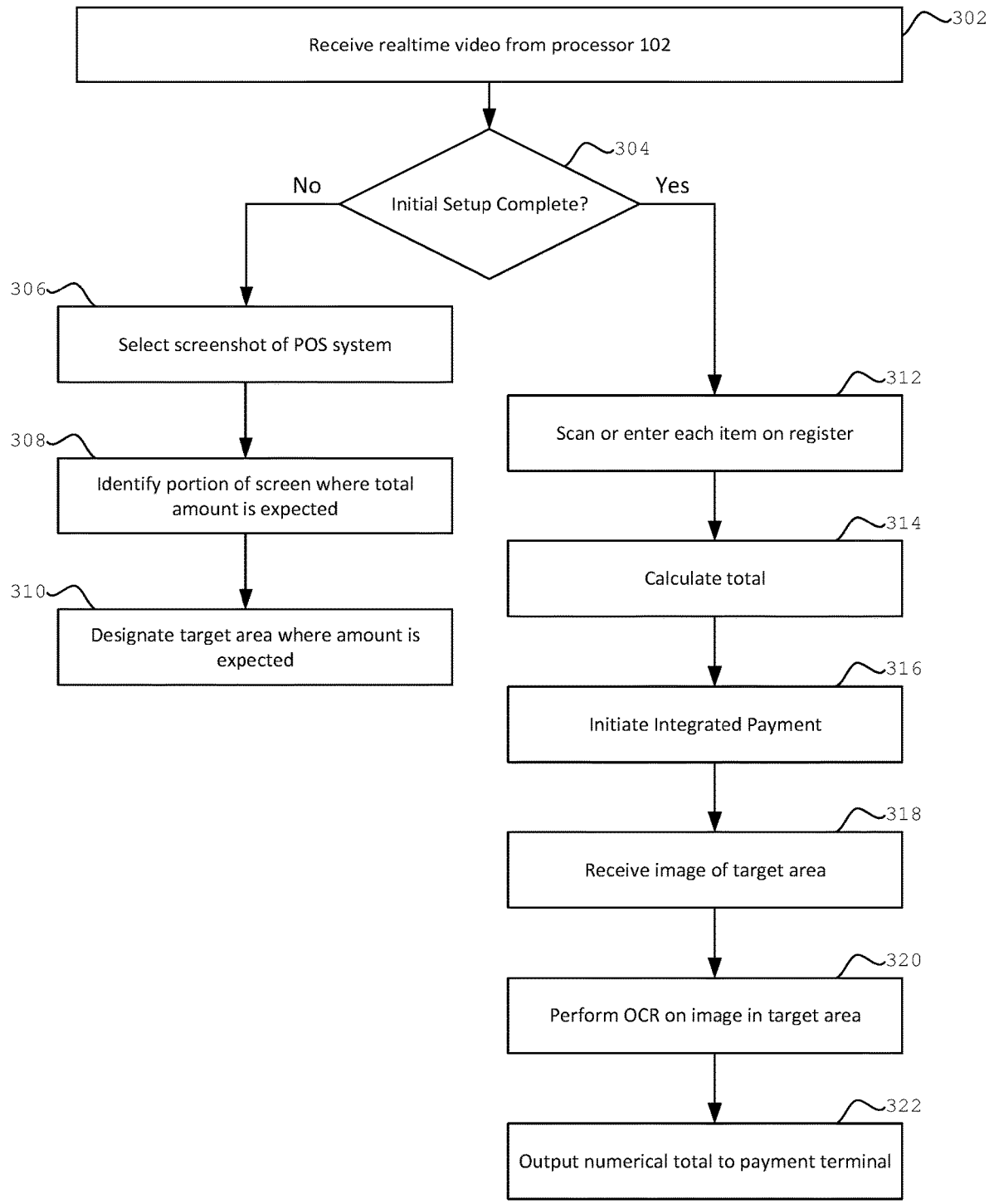
FIG. 3 is a flow-chart showing the steps of integrating a register and a payment terminal.
Figure 4:
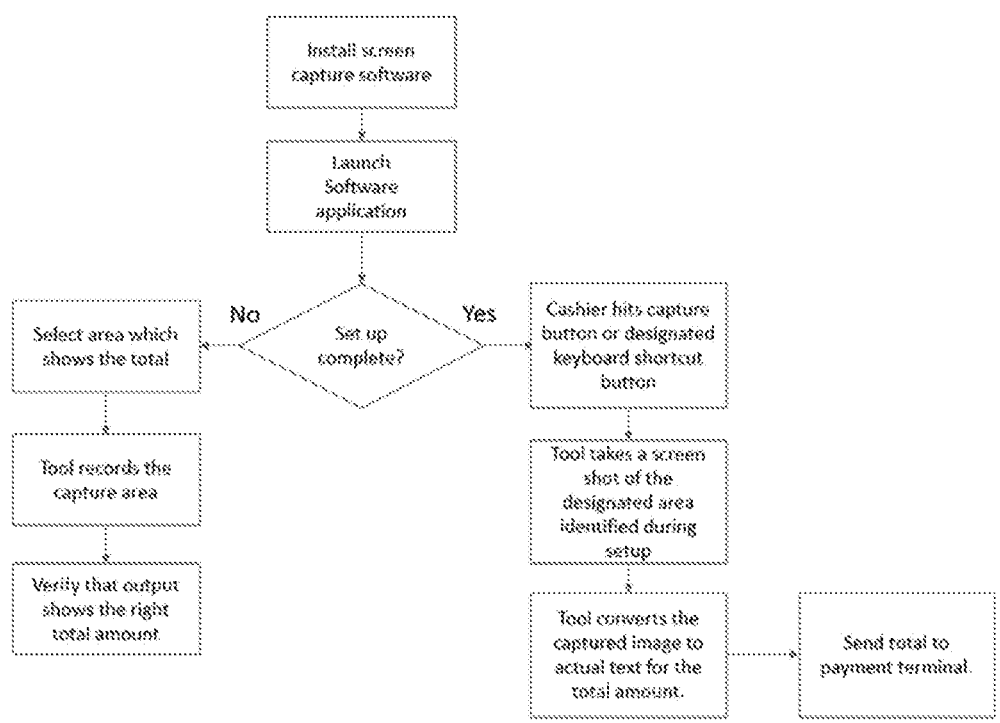
FIG. 4 shows an alternative method for integrating a point-of-sale system with a payment terminal.

FIG. 3 describes a method of using the integrating device 200 to increase productivity, reduce liability and lower the number of mistakes being made at checkout. In use, a checkout clerk may use the register to key-in, scan or otherwise add each item being purchased. After scanning all items, the integrating device 200 will seamlessly send the correct amount to the payment terminal without additional input from the clerk. With the device 200 connected as shown in FIG. 2, the device 200 will receive real-time video signal from processor 102, the signal corresponding to the image on the register (step 302).

The integrating device 200 is configured to work with any point-of-sale software. An initialization process allows the integrating device to work with any program or software (step 304). If the device has never been used, or has not been used with a particular piece of software, or a version of a particular software, the initialization process of steps 306, 308, 310 may be completed. Completing the initializing process is simple. First, the point-of-sale software is opened and the user may select an image showing a typical checkout screen on the POS system (step 306). The user may then identify a portion of the screen where the total amount is expected (step 308). This may be the sum of all the cost of all items or services plus applicable taxes and/or fees. The user may then designate a target position where the amount will be expected within the software (step 310). This may be done, for example, by using a mouse or touchpad, and clicking and dragging over the total amount and creating a square around the portion of the screen that will reflect the total amount. This portion of the screen where the total amount due may be termed the "target area".

Once performed, the initialization steps do not need to be repeated unless the POS software is updated and the user interface changes, or another POS software is used. That is, the initialization steps are designed to be performed once on the system and the system will continue to operate so long as the total cost continues to appear in the same designated target area of the screen. Once initialized, the method may be used as follows. The clerk may scan or enter each item or services as needed into the POS software at the register (step 312). This may be done by manually keying in an item number, or by scanning a barcode. After all the items have been scanned and any discounts are applied (e.g., loyalty programs, bulk purchase discounts, seasonal sales, etc.), the total including any applicable taxes or fees is calculated (step 314). The user may ask the customer if they wish to pay with cash or credit. If credit card payment is indicated, the clerk may initiate the integrated payment system (step 316). Such initiation may take the form of a physical or soft button or soft button on the integrated device 200. The processor of device 200 will process the image on the screen and receive an image of the total, and specifically the target area. The processor of device 200 will then perform optical character recognition (OCR) on the target area, which is in the form of an image (step 320), and convert the image into a string of characters representing a numerical total. Specifically, after initialization, the processor of device 200 will expect that the total be positioned in the same target area, and will repeatedly OCR an image of the target area when prompted for each sale. The processor will then output the numerical total and push it to payment terminal 300 (step 322).

Using the above-described method, several advantages are contemplated. First, the payment terminal may be oriented toward the customer, and the customer may pay for the goods or services by swiping their card, inserting the chip or using the keypad. This avoid having to physically hand over the card to the clerk, giving the customer increased security and reducing liability on the business. Second, because the method takes the total from the register and sends it to the payment terminal, there is no need for the clerk to manually input the total into the payment terminal. This reduces the risk of error and makes reconciliation simple. Additionally, both the business and the customer may be more confident that the customer is being charged the correct amount. By eliminating the extra step of manually entering the total amount into the payment terminal, efficiency and productivity are also increased. Customers satisfaction is also increased by this efficiency. These advantages are accomplished without having to replace an older or stand-alone point-of-sale register system, and without having to pay a premium for integrated systems and software. It also gives the business freedom to choose the most appropriate point-of-sale software (e.g., that software that is best suited for the business, or is the most cost-effective, or has other capabilities such as inventory management), without worrying about having that point-of-sale software be compatible with a given payment terminal.

In another embodiment for integrating payments from the POS register to the payment terminal, a software process may utilize existing hardware of the register to integrate the register with the payment terminal. The method may include capturing POS functions by selecting a screenshot of the POS register system in a specifically selected pixel dimension area of the screen identified as the target area where the total amount is expected. After the POS register system has completed a transaction, if the user requests to use a credit card, the cashier may click a button on the integrating software which causes a command to calculate the total, initiate the integrated payment, receive an image of the designated area, perform the OCR read function based on that image, and outputs a numerical total to the payment terminal. The user can then initiate the payment without the cashier manually entering the numerical number or holding the credit card.

Having described the invention in detail and by reference to the preferred embodiments, it will be apparent that modifications and variations thereof are possible without departing from the scope of the invention.

It will be appreciated that the various dependent claims and the features set forth therein can be combined in different ways than presented in the initial claims. It will also be appreciated that the features described in connection with individual embodiments may be shared with others of the described embodiments.

What is claimed is:

1. A method of linking a point-of-sale register and a payment terminal into an integrated point-of-sale system comprising:
   entering at least one item into the point-of-sale register;
   calculating, at the point-of-sale register, a total cost of the at least one item;
   receiving an image from the point-of-sale register at an integrating device, the integrating device having a processor and a video capture card;
   converting the image to digital data via the video capture card;
   locating the total cost in the digital data by identifying a target area;
   performing optical character recognition via the integrating device on the target area; and
   outputting a numerical total from the integrating device to a payment terminal.

2. The method of claim 1, wherein the at least one item includes a plurality of items.

3. The method of claim 1, further comprising the step of physically connecting the integrating device to the point-of-sale register via a cable.

4. The method of claim 1, further comprising the step of wirelessly connecting the integrating device to the point-of-sale register.

5. The method of claim 1, further comprising the step of physically connecting the integrating device to the payment terminal via a cable.

6. The method of claim 1, wherein the payment terminal is configured and arranged to process credit cards.

7. The method of claim 1, further comprising an initialization series of step prior to entering the at least one item.

8. The method of claim 7, wherein the initialization series includes selecting a screenshot from a point-of-sale register, identifying a portion of the screen where the total cost is expected, and designating the target area where the total cost is expected.

9. The method of claim 8, wherein designating the target area includes using an input device to draw a rectangle around the target area.

10. The method of claim 1, wherein the integrating device includes a memory, and further comprising the step of storing information about transactions in the memory.

11. An integrated point-of-sale system comprising:
    a point-of-sale register configured to calculate a total cost of the at least one item;
    an integrating device having a processor and a video capture card, the integrating device being in communication with the point-of-sale register and configured and arranged to a) receive a real-time video feed from the point-of-sale register, b) convert the video feed to digital data via the video capture card, c) locate the total cost in the digital data by identifying a target area, d) preform optical character recognition on the target area;
    a payment terminal configured and arranged to process credit cards, the payment terminal being in communication with the integrating device and to received a numerical total from the integrating device.

12. The integrated point-of-sale system of claim 11, further comprising a first physical connection between the integrating device and the point-of-sale register.

13. The integrated point-of-sale system of claim 12, wherein the first physical connection is an HDMI cable.

14. The integrated point-of-sale system of claim 11, further comprising a second physical connection between the integrating device and the payment terminal.

15. The integrated point-of-sale system of claim 14, wherein the second physical connection is a terminal to usb cable.

16. The integrated point-of-sale system of claim 11, wherein the integrating device further comprises a display.

17. The integrated point-of-sale system of claim 11, wherein the integrating device further comprises a memory.

18. The integrated point-of-sale system of claim 11, wherein the integrating device further comprises a physical connection to a monitor of the point-of-sale register.

* * * * *